United States Patent
Shah et al.

(10) Patent No.: US 9,085,989 B2
(45) Date of Patent: Jul. 21, 2015

(54) AIRFOILS INCLUDING COMPLIANT TIP

(75) Inventors: Pranav Dhoj Shah, Albany, NY (US);
Scott Roger Finn, Niskayuna, NY (US);
Nicholas Joseph Kray, Mason, OH (US); Ian Francis Prentice, Cincinnati, OH (US); Dong-Jin Shim, Cohoes, NY (US); Bo Wang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 730 days.

(21) Appl. No.: 13/336,001

(22) Filed: Dec. 23, 2011

(65) Prior Publication Data
US 2013/0164140 A1     Jun. 27, 2013

(51) Int. Cl.
*F01D 5/20*     (2006.01)
*F01D 21/04*     (2006.01)

(52) U.S. Cl.
CPC ............. *F01D 5/20* (2013.01); *F01D 21/045* (2013.01); *F05D 2300/43* (2013.01); *F05D 2300/431* (2013.01); *F05D 2300/432* (2013.01); *Y02T 50/672* (2013.01); *Y02T 50/673* (2013.01)

(58) Field of Classification Search
USPC ........... 415/115, 119; 416/229 R, 224, 241 R
See application file for complete search history.

(56) References Cited

U.S. PATENT DOCUMENTS

| | | |
|---|---|---|
| 4,118,147 A | 10/1978 | Ellis |
| 4,417,854 A | 11/1983 | Cain et al. |
| 5,482,429 A | 1/1996 | Penda et al. |
| 5,683,636 A | 11/1997 | Van Der Spek et al. |
| 6,206,642 B1 | 3/2001 | Matheny et al. |
| 6,398,499 B1 | 6/2002 | Simonetti et al. |
| 6,431,837 B1 | 8/2002 | Velicki |
| 7,549,841 B1 | 6/2009 | Marussich |
| 7,575,417 B2 | 8/2009 | Finn et al. |
| 7,837,446 B2 | 11/2010 | McMillan et al. |

(Continued)

FOREIGN PATENT DOCUMENTS

| | | |
|---|---|---|
| CN | 101344014 A | 1/2009 |
| EP | 2253806 A2 | 11/2010 |

(Continued)

OTHER PUBLICATIONS

EP Search Report and Written Opinion issued May 27, 2014 in connection with corresponding EP Patent Application No. 12196990.1.

(Continued)

*Primary Examiner* — Nathaniel Wiehe
*Assistant Examiner* — Wayne A Lambert
(74) *Attorney, Agent, or Firm* — John P. Darling

(57) ABSTRACT

An airfoil, a fan assembly and an engine include at least one airfoil including a root portion, a body portion and a tip portion. The body portion is configured extending radially outward from the root portion and the tip portion is configured extending radially outward from the root portion and the body portion. The airfoil including a suction and a pressure side coupled together at a leading and a trailing edge and extending therebetween. The airfoil including a compliant tip at the tip portion. The compliant tip extending along at least a portion of the tip portion in a chord-wise direction and a span-wise direction. The compliant tip is configured to provide wave propagation along the tip portion such that critical strain proximate the tip portion and the trailing edge is reduced during a foreign object impact.

21 Claims, 9 Drawing Sheets

(56) References Cited

U.S. PATENT DOCUMENTS

| | | |
|---|---|---|
| 7,960,671 B2 | 6/2011 | Dane et al. |
| 8,083,487 B2 | 12/2011 | Wood et al. |
| 2008/0159866 A1 | 7/2008 | Evans et al. |
| 2010/0296942 A1 | 11/2010 | Jevons |
| 2011/0033302 A1 | 2/2011 | Ventura et al. |
| 2011/0142670 A1 | 6/2011 | Pilpel et al. |

FOREIGN PATENT DOCUMENTS

| | | |
|---|---|---|
| EP | 2273072 A2 | 1/2011 |
| EP | 2309098 A1 | 4/2011 |

OTHER PUBLICATIONS

Chinese Office Action issued in connection with corresponding CN Application No. 201210557606.6 on Apr. 3, 2015.

AIRFOILS INCLUDING COMPLIANT TIP

BACKGROUND

Embodiments presented herein relate generally to aerodynamic surfaces, and more specifically to configuration of an aerodynamic surface, such as an airfoil, that is resistant to high surface strains experienced during foreign object impacts.

Turbines include, but are not limited to, gas and steam turbine power generation equipment and gas turbine aircraft engines. A turbine engine typically includes a core engine having a high pressure compressor to compress the air flow entering the core engine, a combustor in which a mixture of fuel and compressed air is burned to generate a propulsive gas flow, and a high pressure turbine which is rotated by the propulsive gas flow and which is connected by a larger diameter shaft to drive the high pressure compressor. A typical front fan gas turbine engine adds a low-pressure turbine (located aft of the high pressure turbine) which is connected by a smaller diameter coaxial shaft to drive the front fan (located forward of the high pressure compressor). The low-pressure compressor is sometimes called a booster compressor or simply a booster.

The fan and the high and low pressure compressor of turbine engines have turbine blades each including an airfoil portion attached to a shank or dovetail portion. Conventional gas turbine blade designs typically have airfoil portions that are made entirely of metal, such as titanium, or are made entirely of continuous fiber reinforced composites (CFRC). The all-metal blades are heavier in weight which results in lower fuel performance and requires sturdier blade attachments, while the lighter all-composite blades are more susceptible to damage from foreign object impacts, such as bird ingestion events. Known hybrid blades include a composite blade having an airfoil shape which is covered by a surface cladding (with only the blade tip and the leading and trailing edge portions of the surface cladding comprising a metal) for erosion and foreign object impacts. The gas turbine fan blades typically are the largest (and therefore the heaviest) blades in a gas turbine aircraft engine and the front fan blades are the first to be impacted by a bird strike. Composite blades have typically been used in applications where weight is a major concern. However, composite blades due to their thinness may develop high strain regions in the blade that may be susceptible to failure during foreign object impact. To lower the strain levels in the blades, it is desirable to change the dynamic response of the composite blade.

Accordingly, there is a need for an improved fan blade that provides a lightweight airfoil that is resistant to high airfoil surface strains experienced during foreign object impacts.

BRIEF DESCRIPTION

In accordance with one exemplary embodiment, an airfoil comprising a root portion, a body portion and a tip portion, a suction side and a pressure side and a compliant tip. The body portion is configured extending radially outward from the root portion and wherein the tip portion is configured extending radially outward from the root portion and the body portion. The suction side and the pressure side are coupled together at a leading edge and a trailing edge spaced chord-wise and downstream from the leading edge. The compliant tip extends along at least a portion of the tip portion in a chord-wise direction and a span-wise direction. The compliant tip is configured to provide wave propagation along the tip portion such that critical strain proximate the tip portion and the trailing edge is reduced during a foreign object impact.

In accordance with another exemplary embodiment, a fan assembly is disclosed. The fan assembly comprising a disk; and a plurality of fan blades coupled to the disk. Each blade of the plurality of fan blades comprising a root portion, a body portion and a tip portion, a suction side and a pressure side and a compliant tip. The body portion is configured extending radially outward from the root portion and the tip portion is configured extending radially outward from the root portion and the body portion. The suction side and the pressure side are coupled together at a leading edge and a trailing edge spaced chord-wise and downstream from the leading edge. The compliant tip extends along at least a portion of the tip portion in a chord-wise direction and a span-wise direction. The compliant tip is configured to provide wave propagation along the tip portion such that critical strain proximate the tip portion and the trailing edge is reduced during a foreign object impact.

In accordance with yet another exemplary embodiment, a fan engine is disclosed. The fan engine comprising a core engine effective for generating combustion gases passing through a main flow path, a power turbine aft of the core engine and including first and second counter rotatable inter-digitated turbine blade rows effective for rotating a drive shaft, a fan section forward of the core engine including a fan blade row connected to the drive shaft, the fan blade row including a plurality of airfoils, each airfoil comprising: a root portion, a body portion and a tip portion, a suction side and a pressure side and a compliant tip. The body portion is configured extending radially outward from the root portion and the tip portion is configured extending radially outward from the root portion and the body portion. The suction side and the pressure side are coupled together at a leading edge and a trailing edge spaced chord-wise and downstream from the leading edge. The compliant tip extends along at least a portion of the tip portion in a chord-wise direction and a span-wise direction. The compliant tip is configured to provide wave propagation along the tip portion such that critical strain proximate the tip portion and the trailing edge is reduced during a foreign object impact.

These and other features and improvements of the present application will become apparent to one of ordinary skill in the art upon review of the following detailed description when taken in conjunction with the several drawings and the appended claims.

DRAWINGS

The above and other features, aspects, and advantages of the present invention will become better understood when the following detailed description is read with reference to the accompanying drawings in which like characters represent like parts throughout the drawings, wherein.

DETAILED DESCRIPTION

Generally provided are exemplary apparatus and methods for fabricating an airfoil such as, but not limited to, for use in a device incorporating aerodynamic surfaces, and more particularly for use in a rotary device. The embodiments described herein are not limiting, but rather are exemplary only. It should be understood that the exemplary apparatus and methods for fabricating an airfoil disclosed herein may apply to any type of airfoil or aerodynamic surface, such as, but not limited to, fan blades, rotor blades, ducted fan blades, unducted fan blades, turbine engine, and wind turbines. More specifically, the exemplary apparatus and methods for fabricating an airfoil disclosed herein may apply to any airfoil, or aerodynamic surface, that is subject to impinging foreign objects.

Although the embodiments described herein are described in connection with a turbofan engine, also referred to herein as a turbine engine, and an open rotor propulsion system, also referred to herein as an unducted contra-rotating front fan high bypass ratio engine, or UDF, it should be apparent to those skilled in the art that, with appropriate modification, the apparatus and methods can be suitable for any device including airfoils that are subject to impinging foreign objects and for which resistance to high surface strains experienced during foreign object impacts is of interest.

Figure 1:
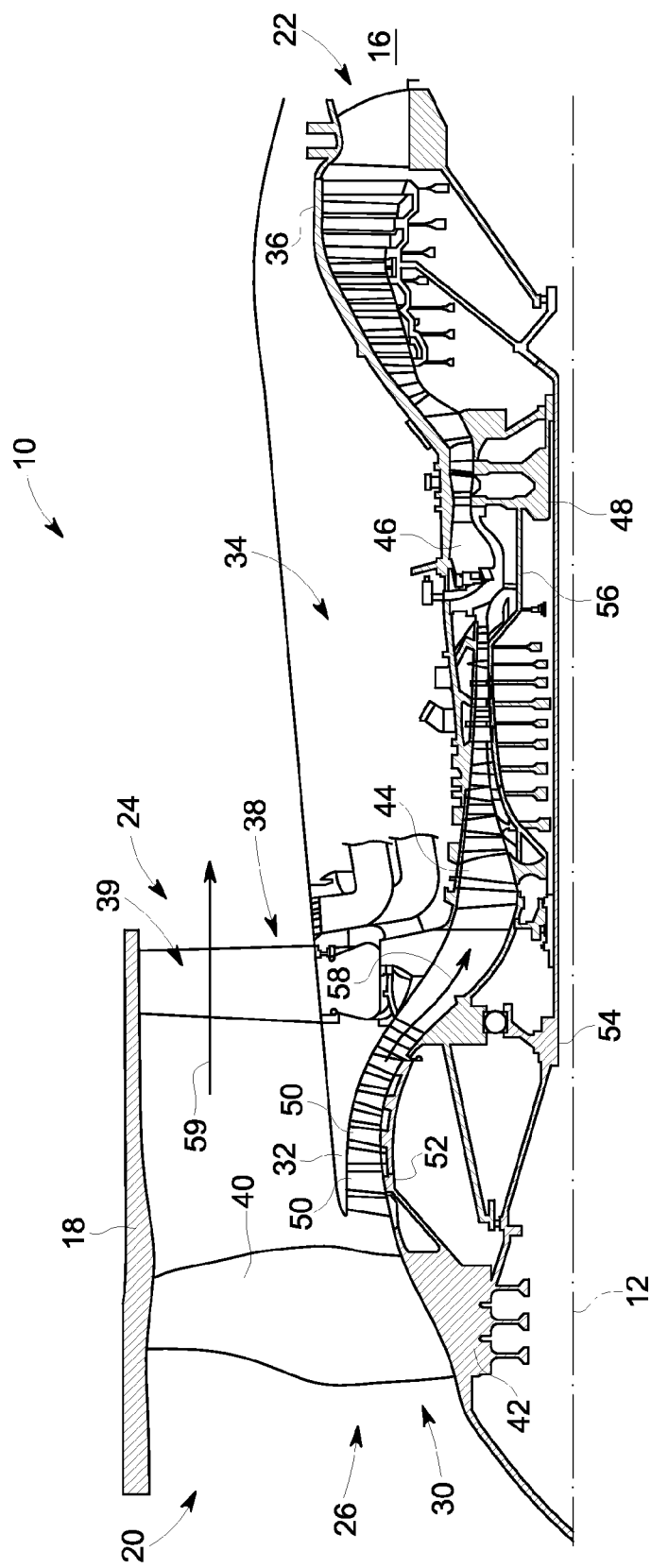
FIG. 1 is a schematic cross-section, illustrating a turbofan gas turbine engine including airfoils having a compliant tip in accordance with an embodiment.

Referring now to FIG. 1, shown is a schematic illustration of an exemplary turbofan gas turbine engine assembly 10 having a longitudinally extending axis or centerline 12 that extends through the engine assembly 10 from front to back (from left to right on FIG. 1). Flow through the illustrated exemplary engine is generally from front to back. The direction parallel to the centerline toward the front of the engine and away from the back of the engine will be referred to herein as the "upstream" direction 14, while the opposite direction parallel to the centerline will be referred to herein as the "downstream" direction 16.

The engine assembly 10 has an outer shell, or nacelle 18, that generally defines the engine. The engine assembly 10 also includes an intake side 20, a core engine exhaust side 22, and a fan exhaust side 24. The intake side 20 includes an intake 26 located at front opening of the nacelle 18, and flow into the engine enters through the intake 26. The fan exhaust side 24 includes an exhaust, or nozzle, (not shown) located at the aft end of the nacelle 18. Flow exits the engine assembly 10 from the exhaust.

A core engine is disposed inside the nacelle 18 and includes a fan assembly 30, a booster compressor 32, a core gas turbine engine 34, and a low-pressure turbine 36 that is coupled to the fan assembly 30 and the booster compressor 32. The fan assembly 30 includes a plurality of fan blades 40, or airfoils, that extend substantially radially outward from a fan rotor disk 42. As described below, the fan blades 40 may be configured to include a compliant tip as described herein, to resist high surface strains experienced during foreign object impacts.

The core gas turbine engine 34 includes a high-pressure compressor 44, a combustor 46, and a high-pressure turbine 48. The booster compressor 32 includes a plurality of blades 50 that extend substantially radially outward from a compressor rotor disk 52 coupled to a first drive shaft 54. The high-pressure compressor 44 and the high-pressure turbine 48 are coupled together by a second drive shaft 56.

During operation, air entering the engine assembly 10 through the intake side 20 is compressed by the fan assembly 30. The airflow exiting the fan assembly 30 is split such that a portion of the airflow, and more particularly a compressed airflow 58 is channeled into the booster compressor 32 and a remaining portion 59 of the airflow bypasses the booster compressor 32 and the core turbine engine 34 and exits the engine assembly 10 through a stationary vane row, and more particularly an outlet guide vane assembly 38, comprising a plurality of airfoil guide vanes 39, at the fan exhaust side 24. More specifically, a circumferential row of radially extending airfoil guide vanes 39 are utilized adjacent fan assembly 30 to exert some directional control of the air flow 59. The plurality of rotor blades 50 compress and deliver the compressed airflow 58 towards the core gas turbine engine 34. The airflow 58 is further compressed by the high-pressure compressor 44 and is delivered to the combustor 46. The airflow 58 from the combustor 46 drives the rotating turbines 36 and 48 and exits the engine assembly 10 through the core exhaust side 22.

Figure 2:
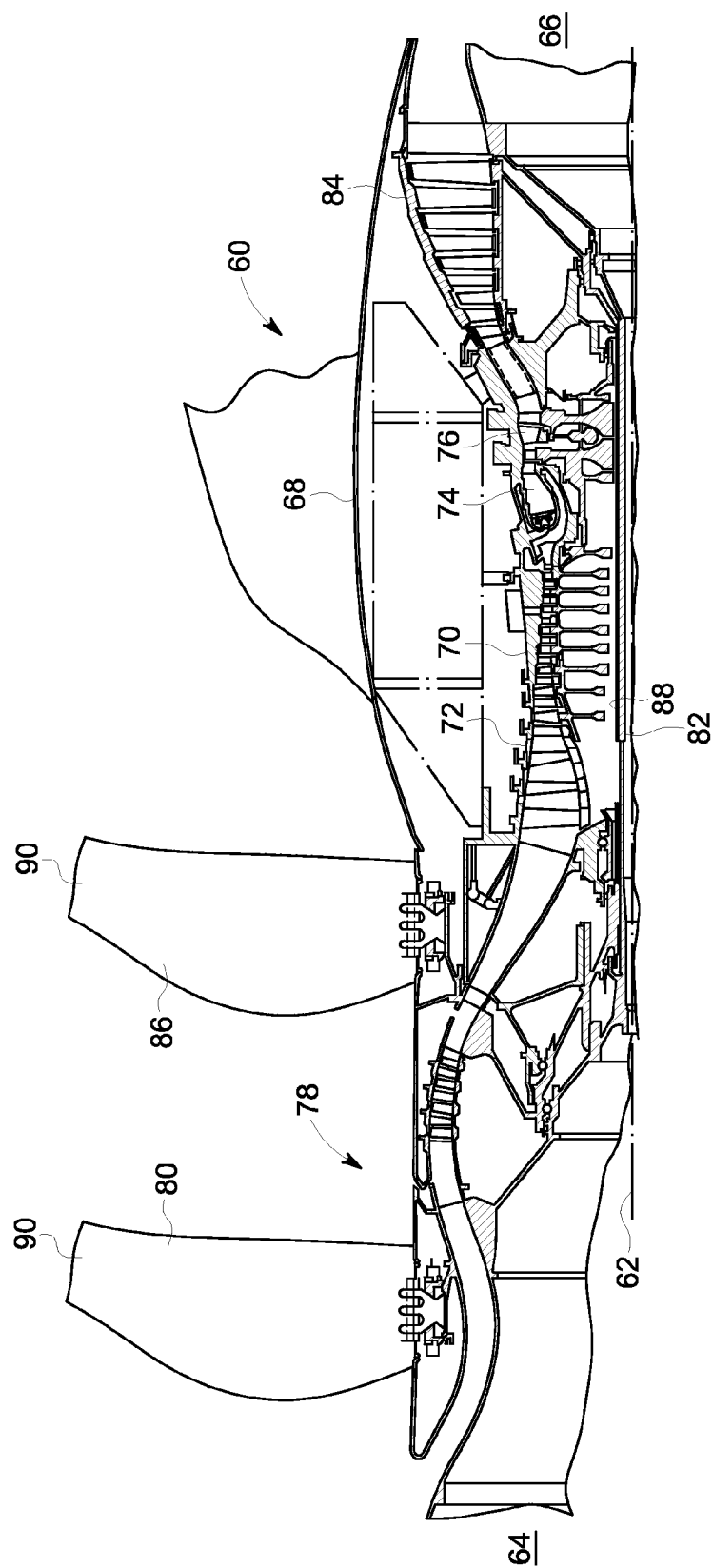
FIG. 2 is a schematic cross-section, illustrating an unducted contra-rotating fan engine including airfoils having a compliant tip in accordance with an embodiment.

Referring now to FIG. 2, illustrated is an unducted contra-rotating fan engine 60 including airfoils having a compliant tip in accordance with an embodiment. More specifically, illustrated is an engine assembly 60 including a longitudinal center line axis 62 that extends through the engine assembly 60 from front to back (from left to right on FIG. 2). Flow through the illustrated exemplary engine is generally from front to back. The direction parallel to the center line axis 62 toward the front of the engine and away from the back of the engine will be referred to herein as the "upstream" direction 64, while the opposite direction parallel to the center line axis 62 will be referred to herein as the "downstream" direction 66.

The engine assembly 60 has an outer shell, or an outer casing 68 disposed co-axially about center line axis 62. Outer casing 68 is conventionally referred to as a nacelle and is nonstructural in that it does not support any of the engine components. It can therefore be constructed of thin sheet metal such as aluminum and/or composite material.

Engine assembly 60 also includes a gas generator referred to as core engine 70. Such core engine includes a compressor 72, a combustor 74 and a high pressure turbine 76, either singular or multiple stages.

At the forward part of the engine 60, there is provided a front fan section 78. Fan section 78 includes a first fan blade row 80 connected to a forward end of an inner contra-rotating shaft 82 which extends between a power turbine 84 and the fan section 78. Front fan section 78 includes a second fan blade row 86 connected to the forward end of an outer drive shaft 88 also connected between the power turbine 84 and the fan section 78. Each of the first and second fan blade rows 80 and 86 comprise a plurality of circumferentially spaced airfoils 90, or fan blades. Fan blade rows 80 and 86 are contra-rotating which provides a higher disk loading and propulsive efficiency. It should be appreciated that the contra-rotating fan blade row 86 serves to remove the swirl on the circumferential component of air imparted by the contra-rotating fan blade row 80. As described below, the airfoils 90 in blade row 80 and 86 may be configured to include a compliant tip as described herein, to resist high surface strains experienced during foreign object impacts and provide a more robust fan blade.

Figure 3:
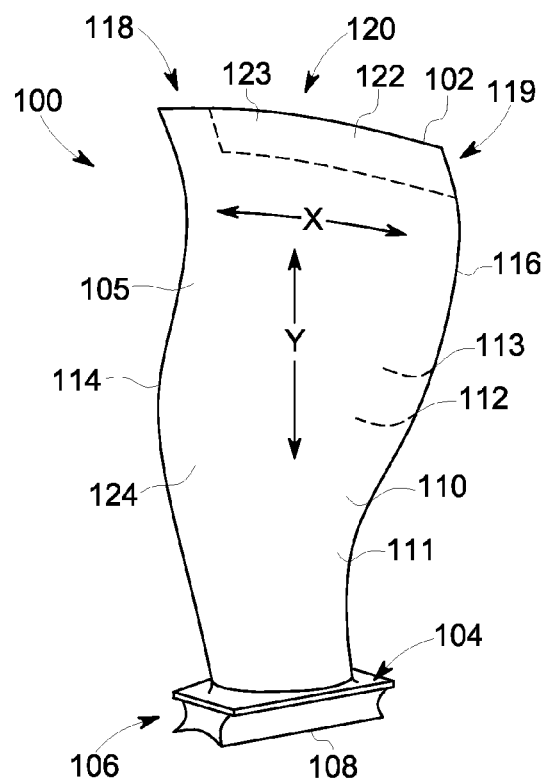
FIG. 3 is a perspective view of an airfoil showing a compliant tip in accordance with an embodiment.
Figure 4:
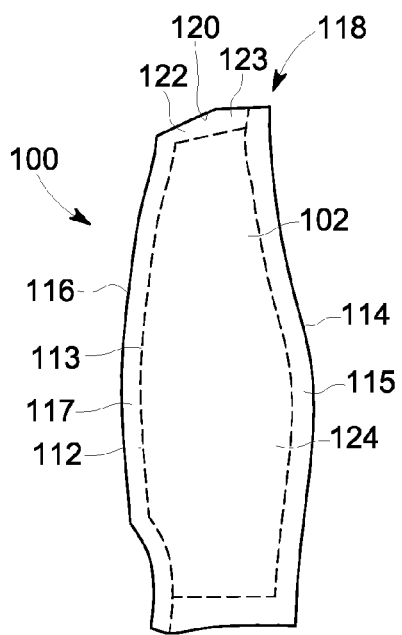
FIG. 4 is side view of an airfoil showing a compliant tip in accordance with an embodiment.

Turning now to FIGS. 3 and 4 illustrated is an exemplary fan blade configured to resist high surface strains experienced during foreign object impacts according to an embodiment. In particular, FIG. 3 is a perspective view of an embodiment of an aerodynamic surface, and more particularly the fan blade embodying an airfoil including the compliant tip as disclosed herein. FIG. 4 is a side view of a pressure side of the airfoil of FIG. 3 wherein like parts are identically referenced. More particularly, illustrated is a fan blade 100, generally similar to the fan blades 40, 80 and 86 of FIGS. 1 and 2, respectively that may be used in a turbofan gas engine assembly, generally similar to the engine assembly 10 of FIG. 1 or an open rotor engine assembly, generally similar to the engine assembly 60 of FIG. 2. In a preferred embodiment, fan blade 100 may reside in a forward or aft positioned bladerow. In an embodiment, the fan blade 100 includes an airfoil 102, a platform 104 and a root portion 106. Alternatively, the airfoil 102 may be used with, but not limited to, rotor blades, and/or turbine blades. The airfoil 102 further includes a body portion 105 and a tip portion 118, wherein the body portion 105 is configured extending radially outward from the root portion 106 and wherein the tip portion 118 is configured extending radially outward from the root portion 106 and the body portion 105.

In an embodiment, the root portion 106 includes an integral dovetail 108 that enables the airfoil 102 to be mounted to a disk, such as a fan rotor disk. The airfoil 102 includes a first contoured sidewall 110 and a second contoured sidewall 112. Specifically, in an embodiment, the first contoured sidewall 110 defines a suction side 111 of the airfoil 102, and the second contoured sidewall 112 defines a pressure side 113 of the airfoil 102. The sidewalls 110 and 112 are coupled together at a leading edge 114 and at an axially-spaced trailing edge 116. The trailing edge 116 is spaced chord-wise and downstream from the leading edge 114. The airfoil 102 includes a thickness measured between the pressure side 113 and the suction side 111 extending from the leading edge 114 to the trailing edge 116, whereby the airfoil thickness varies in a span-wise direction. The pressure side 113 and the suction side 111, and more particularly first contoured sidewall 110 and second contoured sidewall 112, respectively, each extend longitudinally, or radially outward, from the root portion 106 to the tip portion 118. Alternatively, the airfoil 102 may have any conventional form, with or without the dovetail 108 or platform portion 104. For example, the airfoil 102 may be formed integrally with a rotor disk in a blisk-type configuration that does not include the dovetail 108 and the platform portion 104.

In an embodiment, the airfoil 102 includes a compliant tip 120 at the tip portion 118. The compliant tip 120 extends along at least a portion of the tip portion 118 in a chord-wise direction, indicated by "x" and in a span-wise direction, indicated by "y". The compliant tip 102 is configured to provide wave propagation along the tip portion 118 such that critical strain proximate the tip portion 118 and the trailing edge 116 is reduced during a foreign object impact.

In an embodiment, the compliant tip 120 is defined by a portion of the airfoil 102 that is comprised of a compliant material 122 (shown in hidden line), such as, but not limited to, polyurethane, polyurea, fluoroelastomer (FPM), nitrile rubber, ethylene propylene diene monomer (M-class) rubber (EPDM) rubber, epoxy, or combinations thereof. In an embodiment, the material may contain some fiber reinforcement (e.g. glass fiber) for additional strength or stiffness. The compliant material 122 has a lower stiffness compared to a base material 124 that forms the body portion 105 the airfoil 102. In addition, the compliant material 122 has an increased strain capability, thereby providing for a more robust airfoil 102.

In an exemplary embodiment, the compliant tip 120 changes the dynamics of the airfoil 102, and more particularly the fan blade 100 when under an impact condition so that a wave propagation along the tip region 118 occurs in such a way that the critical strain near the tip region 118 and trailing edge 116 is reduced. Wave speed, $C_S$, for bending waves in thin plates is given as:

$$C_B = \sqrt{\omega}\left(\frac{Eh^2}{12(1-v^2)\rho}\right)^{\frac{1}{4}}$$

where,
ω: frequency
h: plate thickness
E, ρ, v: Modulus, density and Poisson's ratio of the medium (plate), respectively.

In order to achieve the desired effect, the compliant tip 120 is comprised of the compliant material 122 chosen such that the wave speed is changed by at least two times of that in the base material 124 of the blade 100. In an embodiment, the compliant tip 120 is comprised of a material 122 having a wave speed at least two times smaller than the base blade material 124. In yet another embodiment, the compliant tip 120 is comprised of a material 122 having a wave speed at least two times larger than the base blade material 124. In addition, the compliant tip 120 is comprised of a high strain-to-failure material as compared to the base blade material 124. In an embodiment, the compliant material 122 includes a stiffness parameter that is approximately 8-10 times more compliant that the base blade material 124. The novel compliant tip 120 as disclosed herein enables the airfoil 102 to resist high surface strains experienced during foreign object impacts. The inclusion of the compliant material 122 to form the compliant tip 120 changes the dynamic response of the fan blade 102 under an impact event. Analysis has shown that this may minimize any whipping action of the trailing edge 116, more particularly at a tailing edge corner 119, during an impact scenario. This in turn may reduce the strain concentrations developed along the trailing edge 116. By reducing the strain at the trailing edge 116, the fan blade 102 is more robust and less prone to failure during an impact event.

As best illustrated in FIG. 4, the airfoil 102 may further include a hybrid trailing edge material 117 (shown in dotted line) at trailing edge 116. More specifically, the airfoil 102 may include a material such as, but not limited to, S-glass to form the trailing edge 116 having a higher strain capability. In addition, the airfoil 102 may further include a metal leading edge 115.

Figure 5:
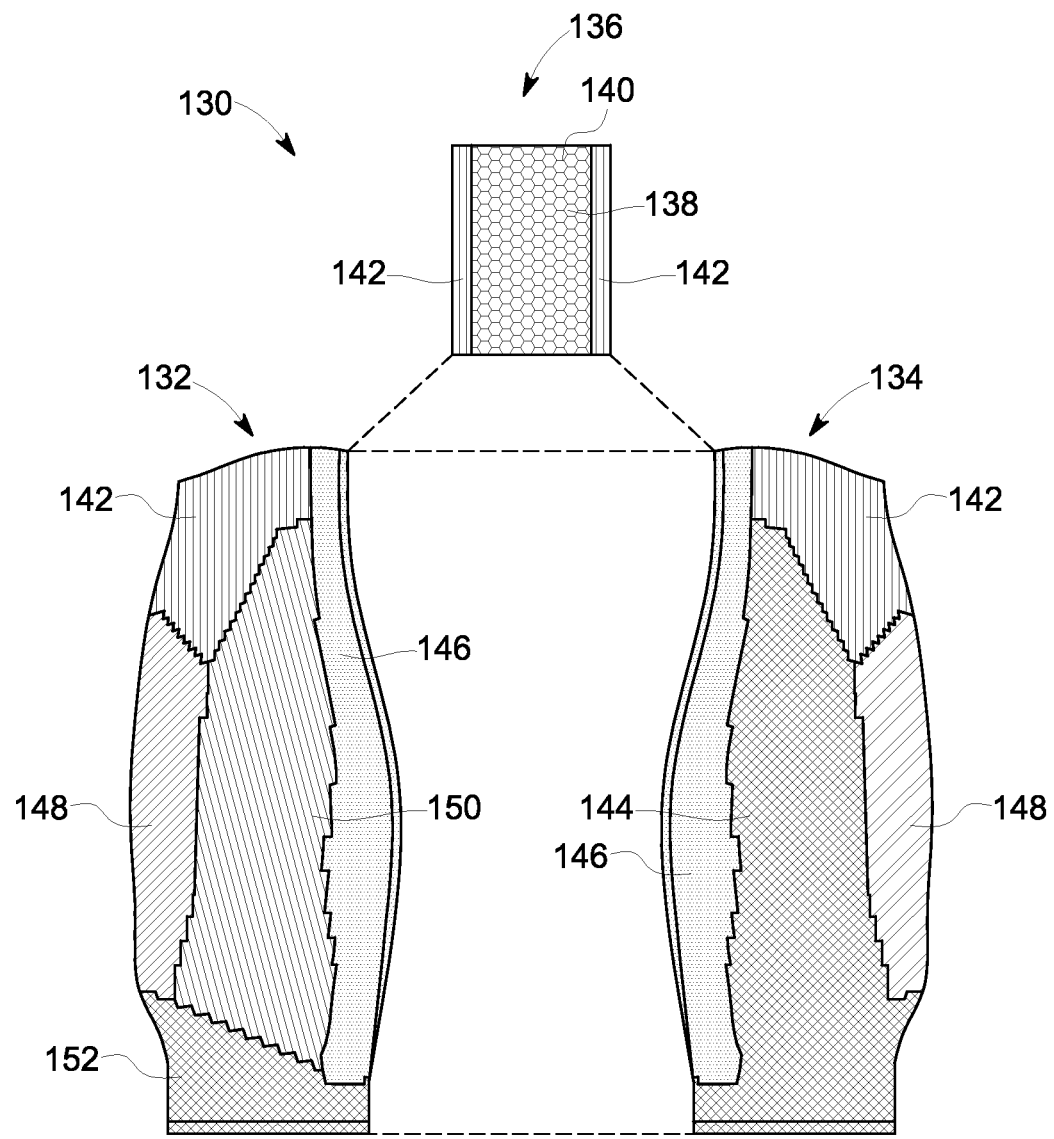
FIG. 5 is a schematic exploded view of an exemplary airfoil including a compliant tip, illustrating a pressure side, suction side and top portion in accordance with an embodiment.
Figure 6:
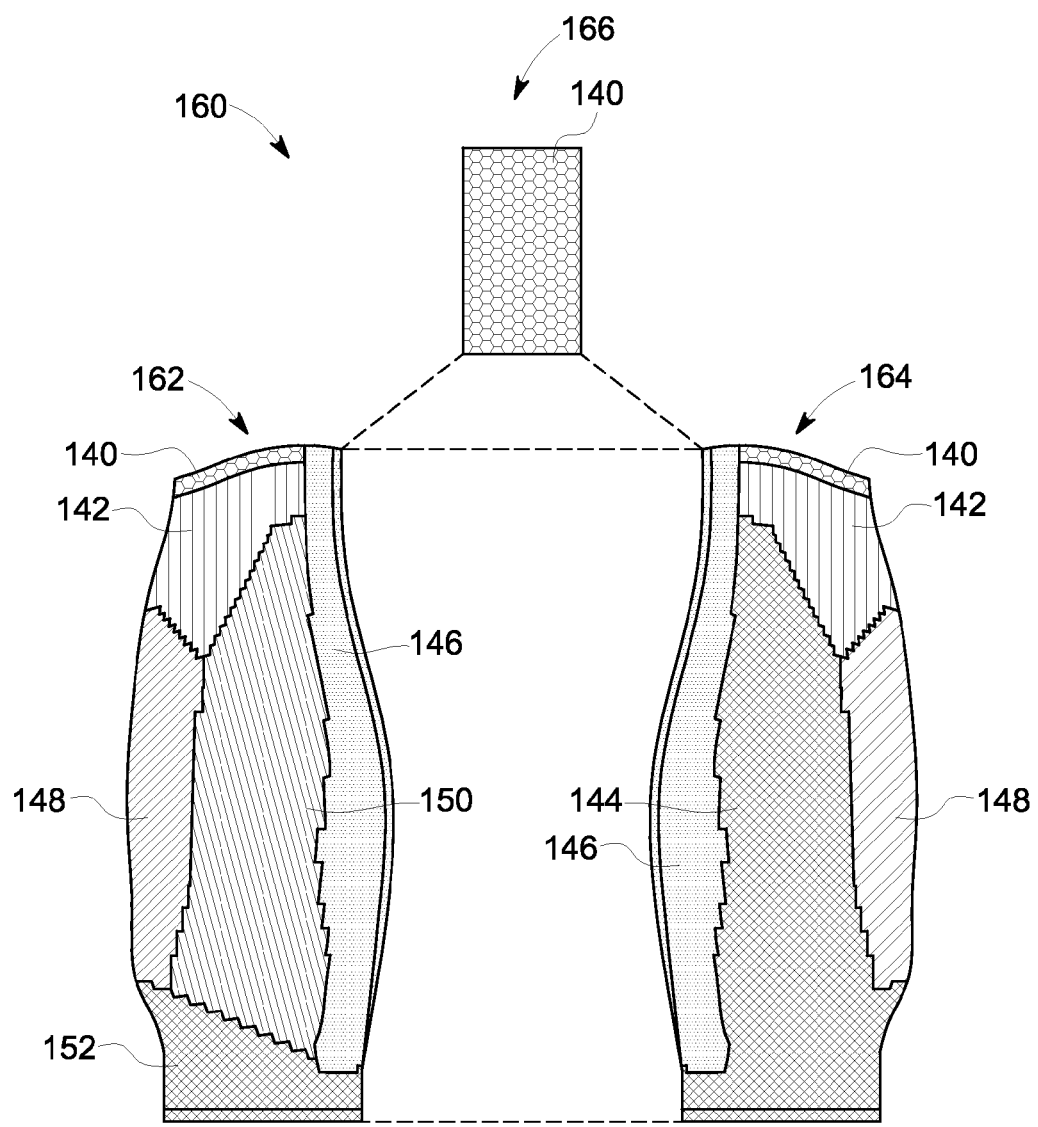
FIG. 6 is a schematic exploded view of an exemplary airfoil including a compliant tip, illustrating a pressure side, suction side and top portion in accordance with an embodiment.
Figure 7:
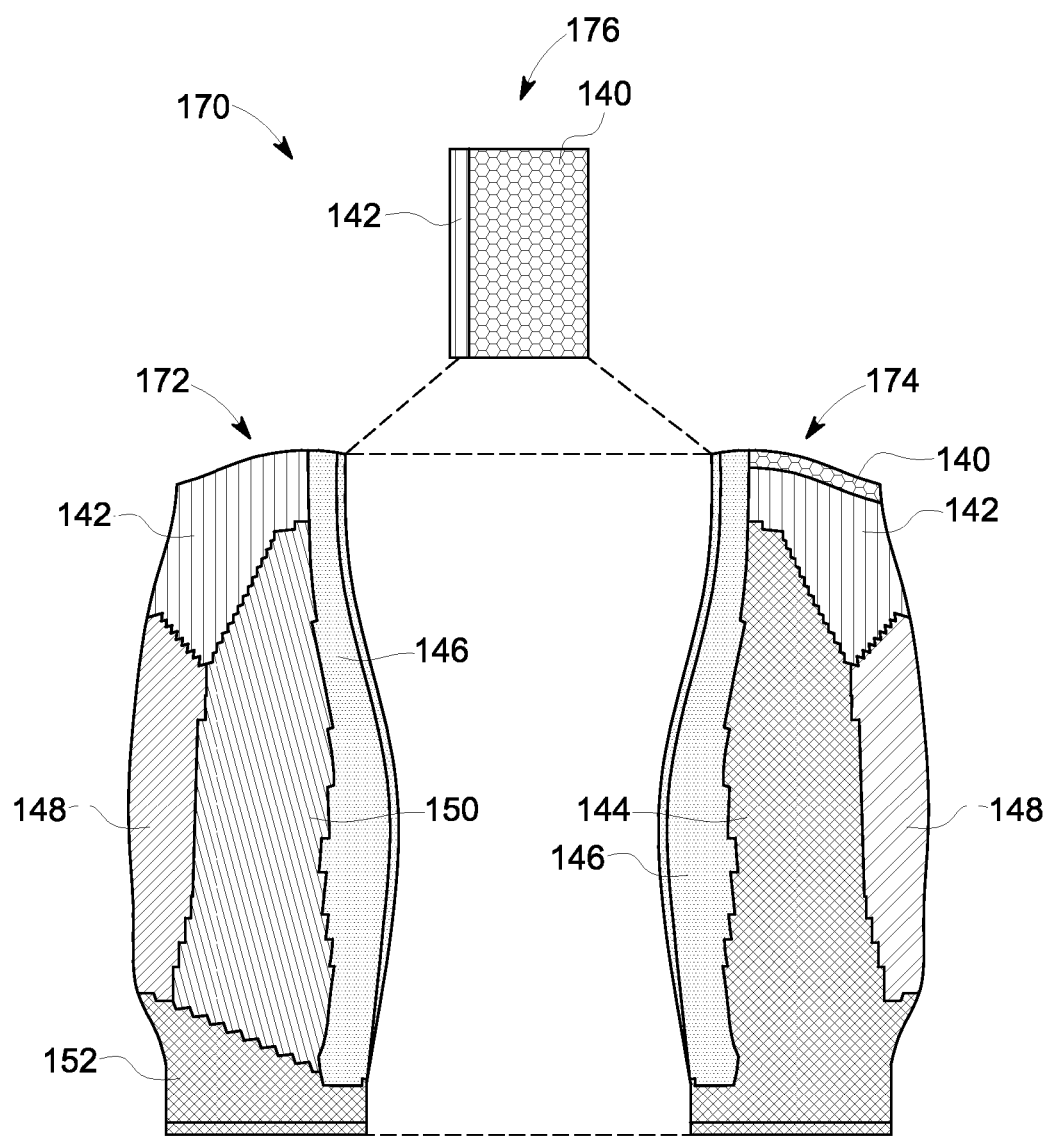
FIG. 7 is a schematic exploded view of an exemplary airfoil including a compliant tip, illustrating a pressure side, suction side and top portion in accordance with an embodiment.

Referring now to FIGS. 5-10, illustrated are various configurations of a blade including a compliant tip portion, similar to blade 100 of FIGS. 3 and 4, for use in an engine assembly, such as engine assembly 10 of FIG. 1 or engine assembly 60 of FIG. 2. FIGS. 5-7 illustrate in schematic exploded views, exemplary airfoils including a compliant tip, illustrating a pressure side, suction side and top portion in accordance with embodiments. FIGS. 8-13 illustrate side views of an airfoil suction side and schematic partial sectional end views showing attachment configurations of the compliant tip to the body portion of the airfoil. It should be understood that like elements have like numbers throughout FIGS. 5-10 and the disclosed embodiments.

Illustrated in FIG. 5 is a blade 130, such as a fan blade, including a compliant tip. More specifically, illustrated is the blade 130, having a blade pressure side 132, a blade suction side 134 and a blade top side 136. The blade 130 is configured to include a compliant tip 138, comprised of a compliant material 140 that is disposed within a tip cap 142, such as a metal tip cap, formed as a part of the blade 130. The compliant material 140 is exposed on the blade top side 136. The blade 130 is further comprised of a base material 144, typically comprised of a composite material, such as those well known in the art. As used herein, the term "composite material" refers to a material containing high strength fibers in a thermosetting or thermoplastic resin matrix. The blade 130 may further comprise a metal leading edge 146, a hybrid trailing edge 148, a pressure side cladding 150, and a composite body portion 152.

Illustrated in FIG. 6 is another embodiment, illustrating a blade 160, such as a fan blade, including a compliant tip. More specifically, illustrated is the blade 160, showing a blade pressure side 162, a blade suction side 164 and a blade top side 166. The blade 160 is configured to include a compliant tip 138, comprised of a compliant material 140. The compliant material 140 is exposed on the blade top side 166, the blade pressure side 162 and the blade suction side 164 along at least a portion of the airfoil length in a span-wise direction and along at least a portion of the airfoil chord length in a chord-wise direction. The blade 130 is further comprised of a tip cap 142, typically comprised of a metal material and a base material 144, typically comprised of a composite material, such as those well known in the art. The blade 130 may further comprise a metal leading edge 146, a hybrid trailing edge 148, a pressure side cladding 150, and a composite body portion 152.

Illustrated in FIG. 7 is yet another embodiment of a blade 170, such as a fan blade, including a compliant tip. More specifically, illustrated is the blade 170, showing a blade pressure side 172, a blade suction side 174 and a blade top side 176. The blade 170 is configured to include a compliant tip 138, comprised of a compliant material 140. The compliant material 140 is exposed on the blade top side 176 and the blade suction side 174 along at least a portion of the airfoil length in a span-wise direction and along at least a portion of the airfoil chord length in a chord-wise direction. The compliant material 140 is covered on the blade pressure side 172 by a tip cap 142, typically comprised of a metal material. The blade 130 is further comprised of a base material 144, typically comprised of a composite material, such as those well known in the art. The blade 130 may further comprise a metal leading edge 146, a hybrid trailing edge 148, a pressure side cladding 150, and a composite body portion 152.

Referring now to FIGS. 8-13, illustrated in schematic exploded side views and schematic partial sectional end views are a plurality of configurations for an airfoil with a compliant tip in accordance with embodiments. It should be understood that like elements have like numbers throughout the disclosed embodiments.

Figure 8:
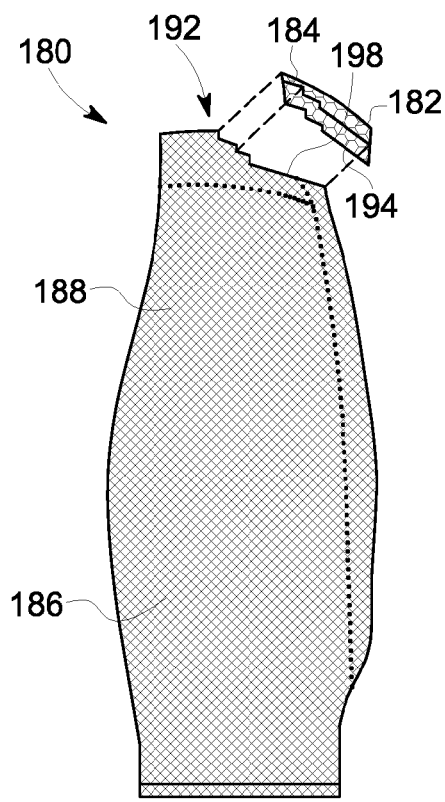
FIG. 8 is an exploded view of an exemplary airfoil including a compliant tip, illustrating the manner in which the compliant tip is adjoined to the main airfoil in accordance with an embodiment.
Figure 9:
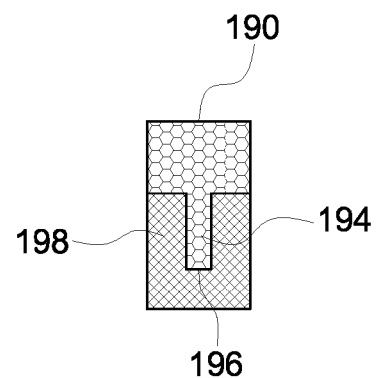
FIG. 9 is a schematic partial cross-section of the airfoil of FIG. 8 in accordance with an embodiment.
Figure 10:
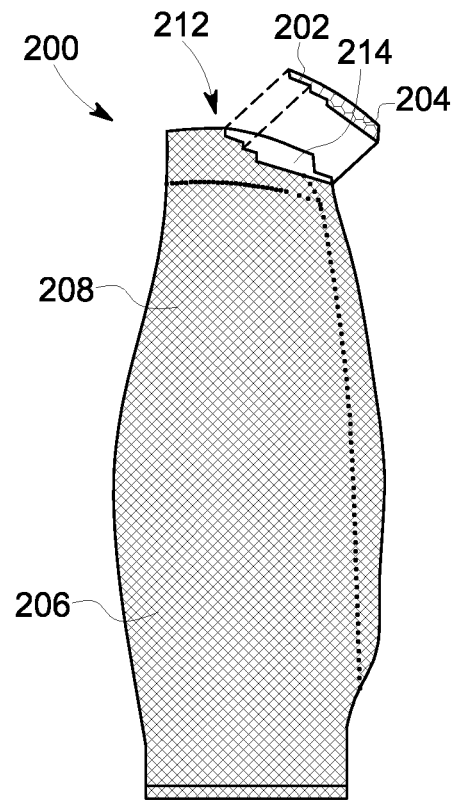
FIG. 10 is an exploded view of an exemplary airfoil including a compliant tip, illustrating the manner in which the compliant tip is adjoined to the main airfoil in accordance with an embodiment.
Figure 11:
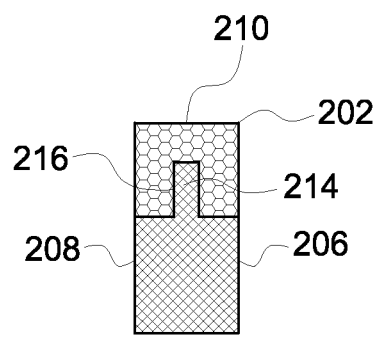
FIG. 11 is a schematic partial cross-section of the airfoil of FIG. 10 in accordance with an embodiment.

Illustrated in FIGS. 8 and 9 is an airfoil 180, including a compliant tip 182. Airfoil 180 is configured generally similar to airfoil 160 of FIG. 6 wherein a compliant material 184 that forms the compliant tip 182 is exposed on a pressure side 186, a suction side 188 and on a blade top side 190. In the embodiment illustrated, the compliant tip 182 and an uppermost part of the body portion 192 of the airfoil 180 are formed having a tongue-in-groove cooperating configuration as best illustrated in FIG. 9 in a partial cross-sectional end view. More specifically, the compliant tip 182 includes a protruding lower portion 194 that is configured to seat within a groove 196 formed on an uppermost edge 198 of the body portion 192 the airfoil 180. The compliant tip 182 may be formed of a polyurethane material that when positioned relative to the body of the airfoil 180 seats into the groove 187 formed in a composite material that comprises the base material of the airfoil 180. Such configuration increases contact surface between the compliant tip 182 and the underlying base material thus increasing the bonding between these components. It is also preferable from manufacturing perspective. Illustrated in FIGS. 10 and 11 is an airfoil 200, including a compliant tip 202. Airfoil 200 is configured generally similar to airfoil 160 of FIG. 6 wherein a compliant material 204 that forms the compliant tip 202 is exposed on a pressure side 206, a suction side 208 and on a blade top side 210. In the embodiment illustrated, the compliant tip 202 and an uppermost part of the body portion 212 of the airfoil 200 are formed having a tongue-in-groove cooperating configuration as best illustrated in FIG. 11 in a partial cross-sectional end view. More specifically, the body portion 212 of the airfoil 200 includes a protruding edge 214 that is configured to seat within a groove 216 formed in the compliant tip 202. The compliant tip 202 may be formed of a polyurethane material that when positioned relative to the body of the airfoil 200, seats onto the protruding edge 214 formed in a composite material that comprises the base material of the airfoil 200. Similar to aforementioned configuration, this configuration provides increased bonding between compliant tip 202 and base material and may be preferable from fabrication point of view.

Figure 12:
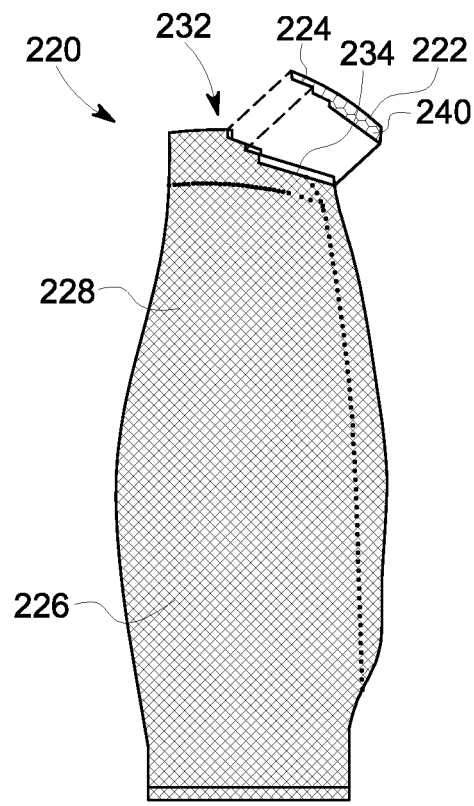
FIG. 12 is an exploded view of an exemplary airfoil including a compliant tip, illustrating the manner in which the compliant tip is adjoined to the main airfoil in accordance with an embodiment.
Figure 13:
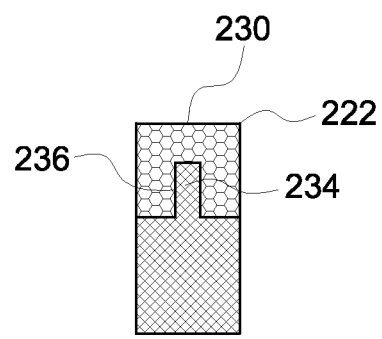
FIG. 13 is a schematic partial cross-section of the airfoil of FIG. 12 in accordance with an embodiment.

Illustrated in FIGS. 12 and 13 is an airfoil 220, including a compliant tip 222. Airfoil 220 is configured generally similar to airfoil 160 of FIG. 6 wherein a compliant material 224 that forms the compliant tip 222 is exposed on a pressure side 226, a suction side 228 and on a blade top side 230. In the embodiment illustrated, the compliant tip 222 and an uppermost part of the body portion 232 of the airfoil 200 are formed having a tongue-in-groove cooperating configuration as best illustrated in FIG. 13 in a partial cross-sectional end view, and generally configured in the same manner as the embodiment illustrated in FIGS. 10 and 11. In contrast to the previously described embodiment, in this particular configuration, the uppermost part of the body portion 232 of the airfoil 230 includes a protruding edge 234 that while configured to seat within a groove 236 formed in the compliant tip 222, is shaped to have a similar overall edge configuration to that of the compliant tip 222, providing for a compliant tip trailing edge 240 that is comprised solely of the compliant material, and thus having altered dynamic responses than compliant tip 202 of FIGS. 10 and 11. As previously described, the compliant tip 232 may be formed of a polyurethane material that when positioned relative to the body of the airfoil 220, seats onto the protruding edge 234 formed in a composite material that comprises the base material of the airfoil 220. While this configuration provides the same benefit in fabrication and bondability as the previous two configurations, such gradual transition between compliant tip 222 and body portion 232 ensures no elevated strains in the transition region. An airfoil including a compliant tip configured in this manner addresses the unsteady aerodynamics that result in blade strain and unsteady whipping action of the trailing edge in response to a foreign object impact. More specifically, the airfoil including a compliant tip configured as described herein facilitates a reduction in unsteady airfoil response of the foreign object impinging on the airfoil such that the strain and wave propagation are facilitated to be reduced. By reducing the strain at the trailing edge, and more particularly, the trailing edge corner, the fan blade is less prone to failure during an impact event. The reduction in strain on the airfoil resulting from a trailing edge oscillating in response to an upstream impinging foreign object and thereby generating high unsteady pressure fluctuations on the airfoil may facilitate engine system performance improvements such as reducing the overall weight of the airfoils while providing a more robust response at the trailing edge. As a result, engine efficiency and performance are facilitated to be improved in comparison to engines using standard airfoils without a compliant tip. The reduction in airfoil strain and aeromechanical loading are achieved without an increase in blade or vane weight, without substantially decreasing aerodynamic performance, and without any otherwise impact on the overall engine system (length, weight, structure, etc.).

Exemplary embodiments of airfoils including fan blades are described above in detail. The airfoils are not limited to the specific embodiments described herein, but rather, may be applied to any type of airfoil that are subjected to foreign object impacts, such as a fan blade, stator, airframe, or an unsteady fluid flow. The airfoils described herein may be used in combination with other blade system components with other engines.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the subsequent claims.

The invention claimed is:

1. An airfoil comprising:
a root portion, a body portion and a tip portion, wherein the body portion is configured extending radially outward from the root portion and wherein the tip portion is configured extending radially outward from the root portion and the body portion;
a suction side and a pressure side coupled together at a leading edge and a trailing edge spaced chord-wise and downstream from the leading edge; and
a compliant tip extending along at least a portion of the tip portion in a chord-wise direction and a span-wise direction,
wherein the compliant tip is configured to provide wave propagation along the tip portion such that critical strain proximate the tip portion and the trailing edge is reduced during a foreign object impact, and
wherein the body portion is comprised of a composite material.

2. An airfoil in accordance with claim 1, wherein the compliant tip is comprised of a compliant material.

3. An airfoil in accordance with claim 2, wherein the compliant material is at least one of a polyurethane, a polyurea, a fluoroelastomer (FPM), a nitrile rubber, ethylene propylene diene monomer (EPDM) rubber and an epoxy.

4. An airfoil in accordance with claim 1, wherein the trailing edge is comprised of a hybrid material.

5. An airfoil in accordance with claim 1, wherein the compliant tip is comprised of a compliant material such that a wave speed traveling therethrough the compliant tip in response to a foreign object impact is changed by at least two times a wave speed traveling therethrough the body portion of the airfoil.

6. An airfoil in accordance with claim 5, wherein the wave speed traveling therethrough the compliant tip is at least two times less than the wave speed traveling therethrough the body portion of the blade.

7. An airfoil in accordance with claim 5, wherein the wave speed traveling therethrough the compliant tip is at least two times greater than the wave speed traveling therethrough the body portion of the blade.

8. An airfoil in accordance with claim 1, wherein the compliant tip is at least partially disposed within a tip cap.

9. An airfoil in accordance with claim 1, wherein the airfoil is one of a fan blade, a rotor blade, a ducted fan blade, an unducted fan blade, or a wind turbine blade.

10. An airfoil in accordance with claim 9, wherein the airfoil is a fan blade of an unducted fan engine.

11. A fan assembly comprising:
a disk; and
a plurality of fan blades coupled to the disk, each blade of the plurality of fan blades comprising:
a root portion, a body portion and a tip portion, wherein the body portion is configured extending radially outward from the root portion and wherein the tip portion is configured extending radially outward from the root portion and the body portion;
a suction side and a pressure side coupled together at a leading edge and a trailing edge spaced chord-wise and downstream from the leading edge; and
a compliant tip extending along at least a portion of the tip portion in a chord-wise direction and a span-wise direction,
wherein the compliant tip is configured to provide wave propagation along the tip portion such that critical strain proximate the tip portion and the trailing edge is reduced during a foreign object impact, and
wherein the airfoil is one of a fan blade, a ducted fan blade, an unducted fan blade, or a wind turbine blade.

12. A fan assembly in accordance with claim 11, wherein each fan blade is configured to facilitate a reduction in strain at the trailing edge associated with a foreign object impact.

13. A fan assembly in accordance with claim 11, wherein the compliant tip is comprised of a compliant material such that a wave speed traveling therethrough the compliant tip is changed by at least two times a wave speed traveling therethrough the body portion of the blade.

14. A fan assembly in accordance with claim 13, wherein the wave speed traveling therethrough the compliant tip is at least two times less than the wave speed traveling therethrough the body portion of the blade.

15. A fan assembly in accordance with claim 13, wherein the wave speed traveling therethrough the compliant tip is at least two times greater than the wave speed traveling therethrough the body portion of the blade.

16. A fan assembly in accordance with claim 11, wherein the compliant tip is at least partially disposed within a tip cap.

17. A fan assembly in accordance with claim 11, wherein the compliant tip and the body portion are configured in a tongue-in-groove cooperating relationship.

18. A fan assembly in accordance with claim 11, wherein the airfoil is a fan blade of an unducted fan engine.

19. A fan engine comprising:
   a core engine effective for generating combustion gases passing through a main flow path;
   a power turbine aft of the core engine and including first and second counter rotatable interdigitated turbine blade rows effective for rotating a drive shaft;
   a fan section forward of the core engine including a fan blade row connected to the drive shaft, the fan blade row including a plurality of airfoils, each airfoil comprising:
      a root portion, a body portion and a tip portion, wherein the body portion is configured extending radially outward from the root portion and wherein the tip portion is configured extending radially outward from the root portion and the body portion;
      a suction side and a pressure side coupled together at a leading edge and a trailing edge spaced chord-wise and downstream from the leading edge; and
      a compliant tip extending along at least a portion of the tip portion in a chord-wise direction and a span-wise direction,
   wherein the compliant tip is configured to provide wave propagation along the tip portion such that critical strain proximate the tip portion and the trailing edge is reduced during a foreign object impact, and
   wherein the airfoil is one of a fan blade, a ducted fan blade, an unducted fan blade, or a wind turbine blade.

20. A fan engine in accordance with claim 19, wherein the airfoil is configured to facilitate a reduction in strain at the trailing edge associated with a foreign object impact.

21. A fan engine in accordance with claim 19, wherein the compliant tip is comprised of a compliant material such that a wave speed traveling therethrough the compliant tip is changed by at least two times a wave speed traveling therethrough the body portion of the airfoil.

* * * * *